(12) United States Patent
Roth et al.

(10) Patent No.: US 11,498,820 B2
(45) Date of Patent: Nov. 15, 2022

(54) DEVICE AND METHOD FOR PROVIDING SORTED STOPPER ELEMENTS

(71) Applicant: SIDEL ENGINEERING & CONVEYING SOLUTIONS, Reichstett (FR)

(72) Inventors: Emmanuel Roth, Reichstett (FR); Daniel Spiesser, Reichstett (FR); Arnaud Schmitt, Reichstett (FR)

(73) Assignee: SIDEL ENGINEERING & CONVEYING SOLUTIONS, Relchstett (FR)

( * ) Notice: Subject to any disclaimer, the term of this patent is extended or adjusted under 35 U.S.C. 154(b) by 0 days.

(21) Appl. No.: 17/280,862

(22) PCT Filed: Sep. 27, 2019

(86) PCT No.: PCT/EP2019/076141
§ 371 (c)(1),
(2) Date: Mar. 26, 2021

(87) PCT Pub. No.: WO2020/064986
PCT Pub. Date: Apr. 2, 2020

(65) Prior Publication Data
US 2022/0002129 A1    Jan. 6, 2022

(30) Foreign Application Priority Data

Sep. 28, 2018    (FR) ...................................... 1858927

(51) Int. Cl.
*G01N 21/90*    (2006.01)
*B65B 57/10*    (2006.01)
(Continued)

(52) U.S. Cl.
CPC ............ *B67B 3/0645* (2013.01); *B65G 43/08* (2013.01); *B65G 47/14* (2013.01); *B65G 47/256* (2013.01);
(Continued)

(58) Field of Classification Search
CPC ........ B67B 3/264; G01N 21/90; B65B 57/10; B65B 7/2807; B07C 5/342
(Continued)

(56) References Cited

U.S. PATENT DOCUMENTS 5,924,546 A * 7/1999 Funaya ................ B65G 47/256
198/459.7
7,911,602 B2    3/2011 Schlieper et al.
(Continued)

FOREIGN PATENT DOCUMENTS

DE    102012216163 A1    7/2013
EP    2899535 A1    7/2015
EP    3372539 A1    9/2018

OTHER PUBLICATIONS

US 2006/0037892 A1, Blanc, Feb. 23 (Year: 2006).*
International Search Report dated Dec. 16, 2019 for PCT/EP2019/076141.

*Primary Examiner* — Douglas A Hess

(57) ABSTRACT

The invention relates to a device for providing stopper elements that are sorted in order to feed a downstream workstation. The devices comprising a lifting means; a means or referencing said stopper elements one by one, located downstream from the lifting means; a conveyor for bringing the referenced elements to said workstation, positioned at the outlet of said referencing means; a vision means for verifying the conformance of said elements in an inspection zone extending at the level of the referencing means and/or of the conveyor; and a means for expelling those elements that do not conform located downstream of said (Continued)

vision means. The inspection zone comprises at least two successive sections each including a distinct color. The invention also relates to a corresponding method.

10 Claims, 2 Drawing Sheets

(51) Int. Cl.
*B65G 47/14* (2006.01)
*B67B 3/064* (2006.01)
*B65G 43/08* (2006.01)
*B65G 47/256* (2006.01)
*B67B 3/26* (2006.01)
*G01N 21/84* (2006.01)
*G01N 21/88* (2006.01)

(52) U.S. Cl.
CPC .......... *B67B 3/264* (2013.01); *G01N 21/909* (2013.01); *B65G 2203/0208* (2013.01); *B65G 2203/0225* (2013.01); *B65G 2203/044* (2013.01); *G01N 2021/845* (2013.01); *G01N 2021/8845* (2013.01)

(58) Field of Classification Search
USPC .................................................... 198/341.01
See application file for complete search history.

(56) References Cited

U.S. PATENT DOCUMENTS

| | | | |
|---|---|---|---|
| 10,259,662 B2* | 4/2019 | Roth | B65G 47/1471 |
| 10,351,352 B2* | 7/2019 | Doudement | B65G 47/1464 |
| 10,745,218 B2* | 8/2020 | Deng | B65G 15/30 |
| 10,850,929 B2* | 12/2020 | Ronchi | B65G 47/901 |
| 10,899,559 B2* | 1/2021 | Roth | B65G 47/1471 |
| 2006/0037892 A1 | 2/2006 | Blanc | |

* cited by examiner

DEVICE AND METHOD FOR PROVIDING SORTED STOPPER ELEMENTS

The present invention falls within the field of supplying sorted stopper elements in order to feed a downstream workstation on a production line.

In a non-limiting manner, stopper elements of this kind consist in capsules or stoppers intended to close an opening in containers, in particular flasks or bottles, made of glass, plastic or metal, in particular aluminum, or waxed cartons.

In known manner, stopper elements, such as stoppers or capsules, are supplied via a sorting module receiving at its inlet said stoppers or capsules tipped in bulk into a storage unit, in particular a hopper. On the one hand, this module sorts these stoppers or capsules in order to dispose them in a position adapted, on the other hand, to supply sorted stoppers or capsules continuously to a downstream workstation on the production line. The principal roles of a downstream workstation of this kind are to fill the containers and then to close them by means of said sorted stopper elements. For example, said downstream workstation may consist in a bottling module provided with a unit for stopping the containers or a unit for sterilizing said stopper elements.

In other words, a sorting module makes it possible to take up stoppers or capsules initially jumbled together and to orient all those stopper elements correctly in a regular and continuous flow feeding at least the downstream workstation the function of which is to close each container by means of a stopper element. A sorting module of this kind is generally known as a cap-feeder.

In known manner, a sorting module comprising in the lower part a storage unit receiving the stopper elements loose and, dipping into said storage unit, a lifting means generally in the form of an endless belt oriented vertically and driven so as to extract and to lift said elements. To be more precise, said belt includes on one face a succession of battens juxtaposed along its length, said battens forming housings extending transversely from one edge to the other and corresponding to the diameters of said stopper elements to be taken up in the storage unit. Moreover, the inclination of the belt, the configuration and the dimensions of said battens produce a particular position of the stoppers taken up. In fact, a stopper that is positioned inside a housing in a configuration other than that required, for example upside down or in a quincunx, is out of balance and drops naturally under gravity as the vertical movement of said conveyor proceeds, thus ensuring that once reaching the end of travel there remain in the housings only stoppers in the chosen configuration. This sorting technique is commonly known as the waterfall technique.

The sorted stopper elements are then in theory accumulated and processed by a referencing means, in particular a referencing wheel, in such a manner as to constitute a regular flow of stopper elements toward a downstream machine, at a rate depending on said downstream machine that must be supplied continuously. To this end said flow is sent from the outlet of the referencing means to a generally upward moving conveyor, in particular in the form of a belt with branches. The stopper elements are moved separately between said branches at regular intervals.

A major problem lies in the fact that said regular flow must imperatively include correctly positioned stopper elements corresponding to the required production run but also that are free of defects. These various criteria constitute the "recipe" of the bottling unit. In other words, the stoppers must be the right way round, corresponding to the containers to be closed (in particular their color and/or any visual marking such as is often applied to the upper face of said stoppers), but must also not have any defect liable to lead to incorrect closing of the containers or even damage caused by malfunctions at the level of the downstream workstation.

In this context, once arrived at the top of the lifting means, the stopper elements have undergone sorting that is not able to ensure, on the one hand, with certainty that no stopper has a wrong orientation and, on the other hand, that it conforms, namely that it has no intrinsic defects, in particular arising from its manufacture, such as differences of color, size or shape, or that there is no foreign body present. Moreover, a stopper may comprise a tamperproof ring attached by a zone of lower strength the presence and the integrity of which must also be verified, on the same terms as those of the stopper itself.

It is then imperative to verify the conformance of the appearance of each of the stopper elements to be sure that they all match each of the various criteria of said recipe, whether that be in terms of orientation and/or any intrinsic characteristic. Any element having a defect must be expelled from said regular flow.

At present this kind of verification of conformance is effected automatically by means of vision means of an inspection system. The latter effects a visual capture, of photograph or video type, the capture beam of which is oriented toward the path crossed by the stopper elements constituting said regular flow, so as to scan each of them. To summarize, one or more cameras are positioned and oriented relative to the circulation path to film each stopper of said flow. In particular, visual capture of this kind is effected at the level of the referencing means or at the level of the upward conveyor so that each stopper element crosses the beam and its image is captured. The inspection system then automatically effects a comparison by digital processing each captured image, in real time, in order to verify the correct correspondence of all the criteria of a recipe, for each stopper element of said flow.

In the event that a fault is proven, even in case of doubt, the inspection system sends a command to an ejection means situated downstream along the upward conveyor and relating to the visual capture. Given that, because of said referencing means, the interval between the stopper elements is known exactly, as well as their speed of movement, and consequently their position at any time, it is possible to control said ejection means precisely in order to extract from the flow each non-conforming stopper element, namely any of them that does not pass this visual inspection step.

A recurrent disadvantage of existing systems equipped for visual capture lies in capture errors stemming from a capture defect because the colors of the stopper elements, above all at the level of their perimeter, merging with those of the structural environment, namely when those colors are similar or identical.

An existing solution consists in improving brightness by positioning one or more light sources illuminating the zone of the visual capture beam. However, although it improves brightness, a solution of this kind is not compatible with operation at a high throughput, in particular if the stoppers are of a similar color to the structure. In fact, in this case the exposure time has to be relatively long, thus necessitating a reduced speed of movement of the stopper elements to effect the visual inspection correctly.

An object of the present invention is to alleviate the disadvantages of the prior art by enhancing the contrast between any stopper element and the structural environment through which it passes at the level of the visual capture beam. In particular, the invention envisages changing at least in part the appearance of the structure, at the level of the capture zone, in such a manner as to contrast visually with the color of the stopper elements circulating therein.

To be more precise, the invention provides at least two sections having different colors clearly distinguished from one another. The colors of the two sections may preferably be complementary. Then, as a function of the colors of the stopper elements to be inspected, in particular of their perimeter, there is obtained when they pass through one of the two sections a flagrant difference with high contrast enabling reliable inspection of their conformance. It then suffices to choose to verify conformance of the stopper elements of a production run in the zone with the more or most appropriate contrast.

The invention relates to a device for providing stopper elements that are sorted in order to feed a downstream workstation, comprising:
 a lifting means for sorting said elements in accordance with their orientation;
 downstream of said lifting means a means for referencing said stopper elements one by one in a regular flow;
 at the outlet of said referencing means a conveyor for bringing the referenced elements one by one to said workstation;
 a vision means for verifying the conformance of said elements when they arrive in an inspection zone of said device, said inspection zone being located at the referencing means and/or the conveyor;
 located downstream of said vision means, a means for expelling those elements that do not conform.

A supply device of the above kind is characterized by the fact that at least the inspection zone comprises at least two successive sections each including a distinct color.

Additionally, but not in a limiting manner, a supply device of the above kind may comprise a means for moving said vision means from a position facing one of said sections to a position facing the other of said sections and vice versa.

Said moving means may be manual.
Said moving means may be automatic.
Said vision means may be fixed and may comprise a wide capture beam oriented toward said sections.
Said vision means may be fixed and may comprise at least one first capture beam oriented toward one of said sections a second capture beam oriented toward another of said sections.
Two sections may be of complementary colors.
One of the sections may be white in color whereas the other section may be black in color.

The invention also concerns a method of providing sorted stopper elements to feed a downstream workstation, comprising at least the following steps:
 sorting the elements according to their orientation in a lifting means;
 referencing the sorted stopper elements one by one and then routing them one by one in a regular flow to the workstation via a conveyor;
 visually inspecting the elements with a vision means during referencing thereof and/or routing thereof to the downstream workstation at the level of an inspection zone; and
 commanding the ejection of elements detected as non-conforming at the time of the visual inspection.

A supply method of the above kind is characterized in that the inspection zone comprises at least two successive sections each including a distinct color; the visual inspection step is carried out at the level of a chosen section the color of which provides better contrast with the elements to be inspected.

Additionally, but not in a manner limiting the supply method, said vision means may be fixed and comprise a wide capture beam oriented toward said sections.

Said vision means may be fixed may comprise at least a first capture beam oriented toward one of said sections and a second capture beam oriented toward the other of said sections and in that said first beam or said second beam may be selected as a function of said chosen section.

The vision means may be mobile and said vision means may be moved facing said chosen section.

Said vision means may be moved manually.
Said vision means may be moved automatically.

Thus the invention makes it possible to determine an optimum contrast of the stopper elements to be inspected by modifying the optical conditions of the framework that they cross, as a function of the appearance of said elements to be inspected. The invention makes it possible to choose the visual difference that it is then possible to obtain when inspecting the stopper elements, ensuring it is appropriate to the recipe of each production run, either known or to come.

Other features and advantages of the invention will emerge from the following detailed description of nonlimiting embodiments of the invention with reference to the appended figures in which.

The present invention concerns the supply of stopper elements 1.

In a non-limiting manner, stopper elements 1 of this kind consist in capsules or stoppers intended to close an opening present in containers, in particular flasks or bottles, made of glass, plastic or metal, in particular of aluminum, or waxed cartons.

Figure 2:
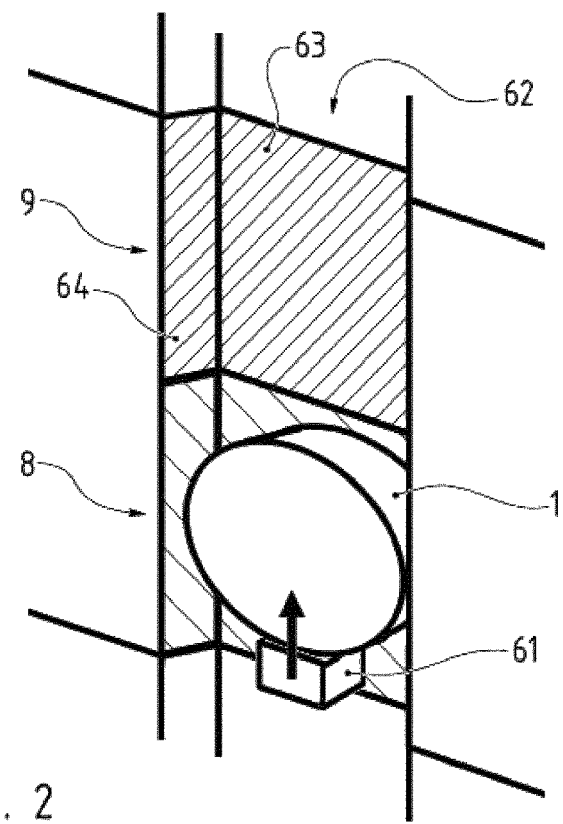
FIG. 2 represents schematically a perspective detail view of one embodiment of a supply device showing two sections with different appearances and a stopper element passing one of said sections.

Stopper elements of this kind generally have a flattened tubular overall shape, as can be seen in FIG. 2.

Upstream of this the stopper elements 1 have to be sorted in order to feed a workstation (not represented) situated downstream on a production line. Sorting of this kind is effected via a supply device 2.

Figure 1:
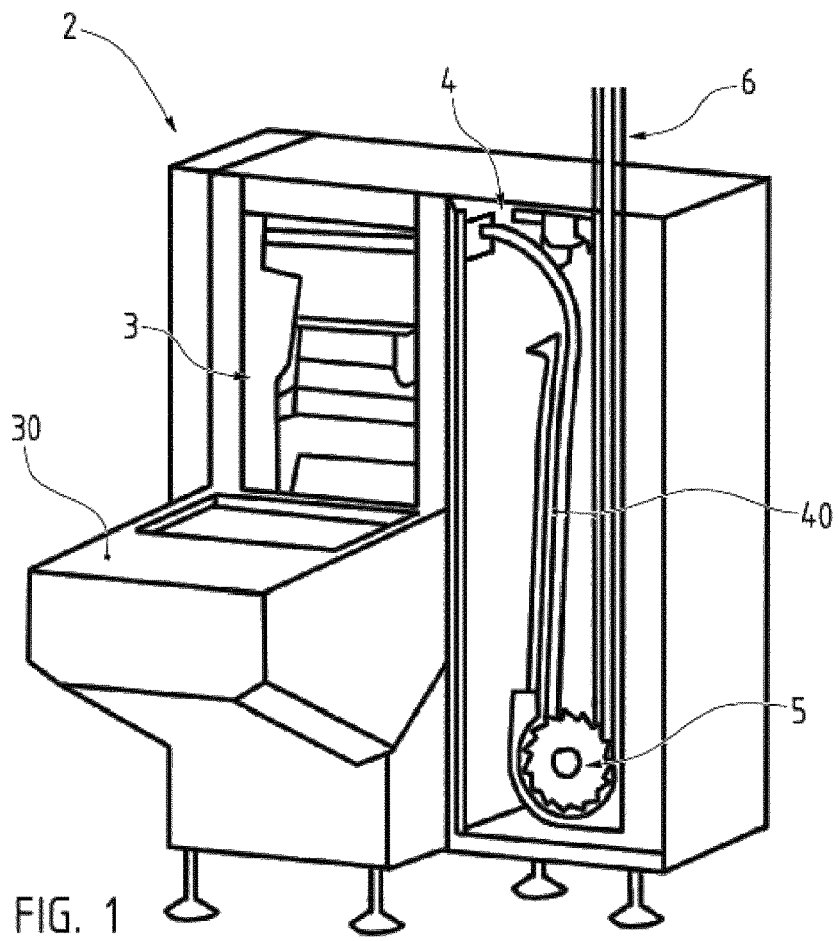
FIG. 1 represents schematically a perspective general view showing a device in accordance with the invention for supplying sorted stopper elements.

An example of a device 2 of this kind is represented in FIG. 1. It comprises lifting means 3 for sorting said stopper elements 1 according to their orientation.

As previously mentioned, in accordance with one embodiment said lifting means 3 may consist in what is known as a waterfall, comprising a sorting belt dipping into a hopper or bin 30 into which the stopper elements 1 have been tipped loose beforehand.

At the outlet the stopper elements 1 are expelled from the lifting means 3, in particular in successive streams, in a discontinuous manner. They may cross a transfer zone 4 provided with at least one single-track column 40 extending vertically or substantially vertically inside which the stopper elements 1 accumulate in heaps, providing a buffer stock, so as to enable a continuous supply.

The device 2 comprises downstream of said lifting means 3 a means 5 for referencing said stopper elements 1 one by one in a regular flow. In other words, a gap is created between the successive products.

A referencing means 5 of this kind may comprise a rotatable referencing wheel. As a general rule it comprises peripheral housings into which the accumulated stopper elements 1 come to be inserted successively one by one as said wheel rotates, in particular from the lower end of the column 40. As they pass through this referencing wheel, the stopper elements 1 may then undergo additional sorting, in particular enabling verification of their angular orientation in accordance with a chosen angle.

At the exit from said referencing means 5 the device 2 comprises a conveyor 6, in particular an upward conveyor, for moving the referenced elements 1 one by one from the referencing means 5 to said workstation.

A conveyor 6 of this kind may comprise a belt 60 equipped with branches 61 situated at regular intervals that push the stopper elements 1 forming the regular flow along said conveyor 6. A conveyor 6 of this kind is preferably an upward conveyor. This conveyor 6 may extend in all directions, preferably vertically or substantially vertically.

Moreover, in accordance with the embodiment represented in FIG. 2, the conveyor 6 may comprise a track 62 that is recessed and inside which the stopper elements 1 circulate. A track of this kind comprises a back 63 surrounded on either side of lateral walls 64. An opening may be provided in said back 63 through which the branches 61 pass. The stopper elements 1 are therefore pushed upward, circulating vertically inside said track 62.

In order to verify the conformance of the stopper elements 1 sorted and dispatched by the supply device 2 the invention provides a step of inspecting each of said stopper elements 1. Inspection of this kind is a visual inspection, in such a manner as to verify the appearance of each stopper element 1, such as its intrinsic characteristics, in particular of shape and color, as well as its correct positioning, but also the presence of any foreign body.

To this end, the device 2 comprises a vision means 7 for inspecting the conformance of said stopper elements 1 when they arrive at the level of an inspection zone.

An inspection zone of this kind may extend at the level of the referencing means 5 and/or of the conveyor 6.

In the event of a non-conclusive inspection of a stopper element 1 it must be ejected. To this end the device 2 comprises downstream of said vision means 7 a means for expelling non-conforming stopper elements 1. In particular, the expulsion means is situated at the level of the conveyor 6, in the form of a mobile ejector member controlled automatically and in synchronism with the advance of the regular flow of stopper elements 1. Thus in the event of inspection of a non-conforming stopper element 1, given that its speed of movement is known as well as its position at a precise time, for example at the moment of the visual inspection, it is possible, at a location downstream on the path of said non-conforming element 1, to command triggering of the expulsion means at the moment when that non-conforming element passes in front of it.

The invention advantageously improves the visual inspection of the stopper elements 1, in particular by enhancing the contrast between said elements and their environment. In other words, the invention makes it possible to choose, as a function of the verifiable characteristics of a type or format of stopper elements 1, the more or most appropriate contrast as a function of the inspection to be effected. In particular, the more or most appropriate contrast may preferably be chosen as a function of the limits or the borders of the stopper elements 1 to be inspected, i.e. the visual difference between the perimeter of a stopper element 1 and the surrounding surfaces must be sharp and precise.

To this end, said inspection zone comprises at least two successive sections 8, 9 each including a distinct color. It is then possible to choose which section 8 or 9 constitutes the more or most appropriate contrast as a function of the visual aspects of the stopper element 1 to be inspected and then to carry out the inspection in that section 8 (or 9) rather than in the other section 9 (or reciprocally 8).

Figure 3:
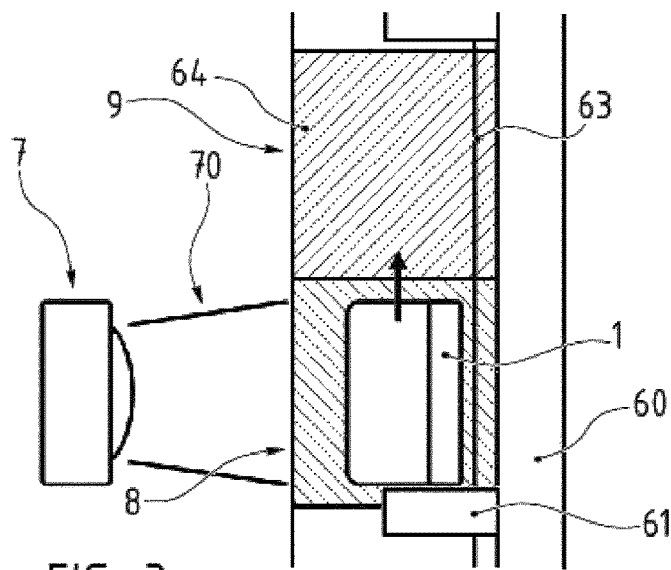
FIG. 3 represents schematically a detail view in vertical section of one embodiment, showing an element passing one of the sections with vision oriented toward that section.
Figure 4:
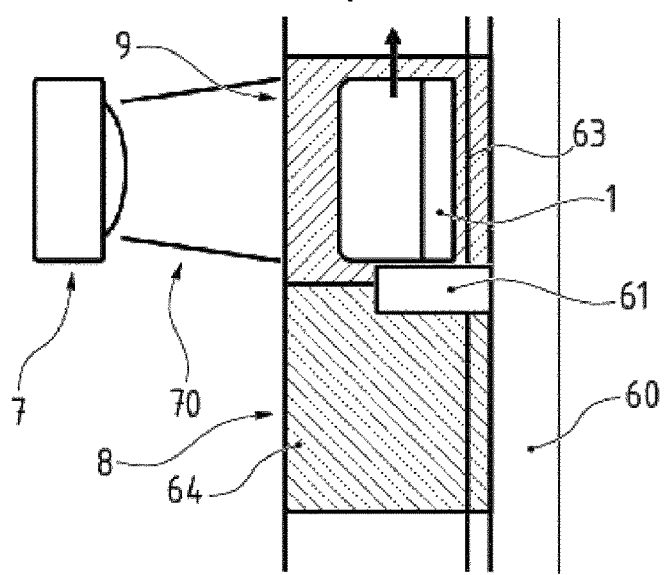
FIG. 4 is a figure similar to FIG. 3, showing an element passing at the level of another section with vision oriented toward that other section, after upward vertical movement of the vision means.

It should be noted that the sections 8, 9 follow on with reference to the direction of movement of the stopper elements 1 in a continuous or back-to-back manner, as can be seen in FIGS. 2 to 4. In accordance with another possible configuration, the sections 8, 9 may be spaced, separated by an intermediate section with no specifically chosen or determined color.

In accordance with the examples represented in FIGS. 2 to 4, the inspection zone comprises two sections 8, 9 including different colors (represented by cross-hatching). In accordance with other embodiments it is possible to have more than two sections 8, 9, in particular a number of sections with as many different colors as the number of the production runs as a function of the different characteristics of the stopper elements 1 to be inspected.

Moreover, the colors of the sections 8, 9 may be chosen and specifically determined, i.e. at least one section, preferably each section 8, 9, may include a color intentionally modified relative to the initial colors of the surrounding structure. That modification may stem from a change of material for the structure of the environment or from applying a covering such as paint or a colored film. A choice of this kind of the modification of at least one color of sections 8, 9 may be effected at the time of manufacture, of installation or later, in a manner dedicated to the time of a production run, in a manner that can be customized by an operator of the device 2.

The modification of the colors of at least one of the sections 8, 9 is preferably effected at the level of the conveyor 6, in particular of the track 62 of the conveyor 6, on the back surfaces 63 and/or of one and/or the other of the lateral walls 64. All the colors of the whole of the environment, in particular of the fixed structural elements, within a section 8, 9 are preferably modified and unified in accordance with one and the same color.

In such a case the colors of the sections 8, 9 may be modified at the level of the referencing means 5, on the surface of the referencing wheel and/or on the internal walls of the housings regularly distributed on the perimeter of said wheel and each intended to receive a stopper element 1.

Preferably, the color to the color of the rest of the device 1.

In accordance with one embodiment, the two sections 8, 9 may be of complementary colors. To summarize, the colors of two different sections 8, 9 can be clearly distinguished, in particular by the naked eye, with no risk of confusion. They may be complementary. Thus they may for example be respectively green and red, or orange and blue, or black and white.

One of the sections 8 may preferably be white in color whereas the other of the sections 9 is black in color.

More particularly, the materials constituting the conveyor 6 are black and one of the sections 8 is entirely changed to white, the other section 9 then consisting of the conveyor 6 in the original color.

Thus inspecting the visual appearance of the stopper elements 1 when they pass in front of one or the other of the sections 8, 9 makes it possible to obtain the more or most appropriate contrast for the vision means 7.

In accordance with one embodiment, said vision means 7 may be at least one still camera, video camera or optical sensor. The vision means 7 makes it possible to store one or more shots of each stopper element 1, or even to record a video sequence. A vision means 7 of this kind is digital. Moreover, appended data processing means handle the digital processing automatically, in particular by comparison with a reference shot of a conforming stopper element 1.

In accordance with one embodiment, as represented in FIGS. 3 and 4, the device 2 comprises a means for moving the vision means 7 from a position facing one of said sections 8 (or 9) to a position facing the other of said sections 9 (or respectively 8) and vice versa. Thus at the start of the production run, as a function of the visual characteristics of the stopper elements 1 to be inspected, it is possible to choose the position of the vision means 7 to effect the visual capture and the face-to-face inspection of the section 8, 9 with the better or best contrast.

In accordance with one embodiment, said moving means may be manual, i.e. moved physically by an operator through direct intervention on the device 2.

In accordance with another embodiment, said moving means is automatic. In one case an operator determines the section 8, 9 with the better or best contrast and commands the movement of the vision means 7 that then comes to be positioned facing said chosen section 8, 9.

In another case, the section 8, 9 with the better or best contrast may be stored for a given production run of stopper elements 1 and, at the time of launching said production run, the moving means, without ancillary intervention, automatically moves the vision means 7 in front of the section 8, 9 previously recorded for that production run, as a function of said stopper elements 1 to be inspected.

In another case, the section 8, 9 with the better or best contrast may be determined automatically by the device 2 via recognition of the color of the stopper elements 1, in particular by an appropriate sensor, followed by digital comparison with the sections 8, 9 with a view to obtaining the best possible contrast. It is also possible for the device 2 to interpret directly data relating to the recipe, known and stored, in order to choose the section 8, 9 with the better or best contrast.

In accordance with another embodiment, the vision means 7 is fixed. It may comprise at least a first capture beam 70 oriented toward one of said sections 8, 9 and a second capture beam 70 oriented toward the other of said sections 9 (or respectively 8). In this instance it is possible to inspect the stopper elements 1 in each section 8, 9, including that with the better or best contrast. It is also possible to choose one of the capture beams 70 to activate, using appropriate means, to effect the inspection in the section having the better or best contrast with the stopper elements 1.

In accordance with another embodiment, the vision means 7 is fixed but may comprise a wide capture beam 70 covering at least two sections 8, 9. A stopper element 1 is then inspected as it passes each section 8, 9, in particular that offering a better or best contrast. A plurality of captures may be effected and compared in order to determine automatically the one that has the better or best contrast with each stopper element 1.

As can be seen in FIGS. 3 and 4, a vision means 7 may be situated in front of the sections 8, 9, i.e. in a frontal manner relative to the conveyor 6 or to the referencing means 5, in particular parallel or substantially parallel to the back 63.

Figure 5:
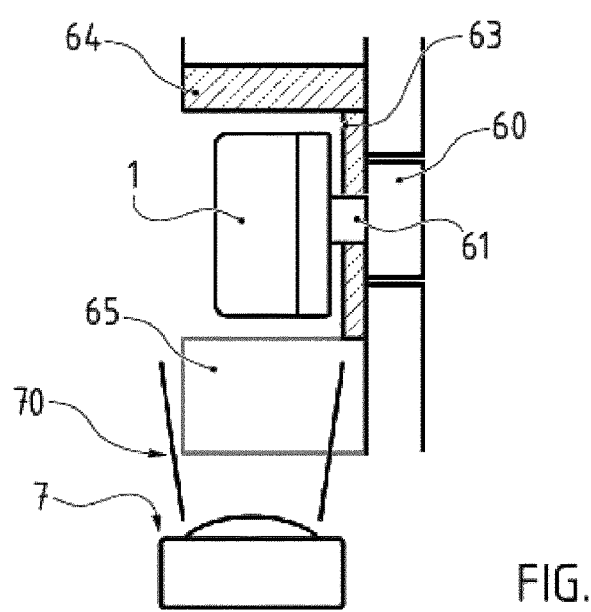
FIG. 5 represents schematically a view in cross section at the level of one of the sections, showing a lateral position of the vision means facing one of said sections.

In accordance with the example that can be seen in FIG. 5, a vision means 7 may be positioned to one side of the sections 8, 9, i.e. laterally relative to the conveyor 6 or to the referencing means 5. At least one portion 65 of a lateral wall 64 of the track 62 of said conveyor 6 may then comprise an opening or consist of a translucent material allowing visual capture by said vision means 7. It is therefore possible to inspect the stopper elements 1 transversely, on their edge, in particular to verify the integrity of the tamperproof ring.

Alternatively, the vision means 7 may be positioned to the side of the referencing means 5, placed at the periphery and oriented radially toward the interior of the housings intended to receive the stopper elements 1, thus enabling their edge to be inspected from the side.

The invention also concerns a method of supplying sorted stopper elements 1 for feeding the downstream workstation.

A supply method of this kind is preferably dedicated to the use of the supply device 2 in accordance with the invention.

As previously mentioned, the stopper elements 1 are sorted according to their orientation in the lifting means 3. The sorted stopper elements 1 are then referenced one by one to route them one by one in a regular stream to the workstation via the conveyor 6.

A visual inspection of the stopper elements 1 is effected with a vision means 7 as they are referenced and/or routed to the downstream workstation at the level of the inspection zone.

As a function of the result of the visual inspection, in the event that non-conformance is detected, the ejection is commanded of the stopper elements 1 detected to have or likely to have an anomaly.

As previously mentioned, the inspection zone comprises at least two successive sections 8, 9 each including a different color.

The visual inspection step is advantageously carried out at the level of a chosen section 8 or 9 the color of which provides better contrast with the stopper elements 1 to be inspected.

Additionally, the invention provides for combining the enhanced contrast through the choice to inspect at the level of one of the sections 8, 9 with a configurable fluctuation of the luminous intensity. Thus it is possible to modify the brightness as a function of the color of the section 8, 9 chosen for the inspection and also of the characteristics of the stopper element 1, such as the color thereof but also the material thereof. The visual capture is improved, in particular with a shorter exposure time, ensuring inspection with a reduced time lapse, enabling the speed of movement of the stopper elements 1 to be increased and thus the production throughput of the supply device 2 to be increased.

The invention claimed is:
1. A device (2) for providing stopper elements (1) that are sorted in order to feed a downstream workstation, comprising:
   a lifting means (3) for sorting said elements (1) in accordance with their orientation;
   downstream of said lifting means (3) a means (5) for referencing said stopper elements (1) one by one in a regular flow;

at an outlet of said referencing means (5) a conveyor (6) for bringing the referenced elements (1) one by one to said workstation;

a vision means (7) for verifying the conformance of said elements (1) when they arrive in an inspection zone of said device (2), said inspection zone being located at the referencing means (5) and/or the conveyor (6); and wherein:

the inspection zone comprises at least two successive sections (8, 9) each including a distinct color, and elements that do not conform are expelled after passing through the inspection zone of the device.

2. The provider device (2) as claimed in claim 1, wherein said vision means (7) is fixed and comprises a wide capture beam (70) oriented towards its sections (8,9).

3. The provider device (2) as claimed in claim 2, wherein two sections (8,9) are complementary colors.

4. The provider device (2) as claimed in claim 1, wherein said vision means (7) is fixed and comprises:

a first capture beam (70) oriented toward one of said sections (8);

a second capture beam (70) oriented toward another of said sections (9).

5. The provider device (2) as claimed in claim 4, wherein two sections (8,9) are complementary colors.

6. The provider device (2) as claimed in claim 1, wherein two sections (8,9) are complementary colors.

7. The provider device (2) as claimed in claim 6, wherein one of the sections (8) is white in color whereas the other section (9) is black in color.

8. A method of providing sorted stopper elements (1) to supply a downstream workstation, comprising:

sorting the elements (1) according to their orientation by means of a lifting means (3);

referencing the sorted stopper elements (1) one by one and then routing them one by one in a regular flow to the workstation via a conveyor (6); and visually inspecting the elements (1) with a vision means (7) during referencing thereof and/or routing thereof to the downstream workstation at the level of an inspection zone;

wherein:

the inspection zone comprises at least two successive sections (8,9) each including a distinct color;

elements that do not conform are expelled after passing through the inspection zone of the device; and the visual inspection step is carried out at the level of a chosen section (8,9) the color of which provides better contrast with the elements (1) to be inspected.

9. The supply method as claimed in claim 8, wherein said vision means (7) is fixed and comprises a wide capture beam (7) oriented towards said sections (8,9).

10. The supply method as claimed in claim 8, wherein said vision means (7) is fixed and comprises at least a first capture beam (70) oriented toward one of said sections (8) and a second capture beam (70) oriented toward the other of said sections (9) and in that said first beam (7) or said second beam (70) is selected as a function of said chosen section (8,9).

* * * * *